Patented Feb. 8, 1938

2,107,527

UNITED STATES PATENT OFFICE 2,107,527

PROCESS FOR CONCENTRATING ORGANIC ACIDS

Theodore Evans, Oakland, and Karl R. Edlund, Berkeley, Calif., assignors to Shell Development Company, San Francisco, Calif., a corporation of Delaware No Drawing. Application November 21, 1933, Serial No. 699,032

38 Claims. (Cl. 260—122)

This invention relates to the processes for concentrating various dilute organic acids and is particularly concerned with the methods in which certain solvents are used for this purpose.

A number of processes are known for concentrating the dilute organic acids, in which ethyl ether, isopropyl ether, ethyl acetate, and other similar solvents are used either as extracting agents, or as components of organic acid-water-solvent systems from which concentrated acids are separated by distillation. In the first group of these processes, the organic acids are concentrated from their water solutions by thoroughly contacting said solutions with a solvent for the acid to be concentrated. Upon settling the dilute acid-solvent mixture separates into two liquid phases: the acid-solvent layer and the water layer. The acid-solvent phase, containing also some water, is withdrawn and the solvent and water are separated from the acid by distillation. The resulting distillate, which consists of the removed solvent and water, is condensed, thereupon in the case of the more desirable solvents separating into two phases, water and solvent which are mutually saturated; the latter is removed and, if desired, returned to the process.

Another general method for concentrating the organic acids from water solutions consists of adding a solvent to the diluted acid and driving off the excess water by boiling the mixture in a distilling apparatus. In this case the presence of the solvent in the dilute acid causes water to separate from the acid in the still with greater ease than it would be possible to accomplish without the addition of the solvent. The latter passes overhead with the water vapor, separates out on condensation, and can be returned intermittently or continuously to the process.

We have discovered that mixed primary secondary and tertiary ethers, such as methyl propyl, methyl butyl, ethyl propyl, ethyl butyl, propyl butyl, propyl isopropyl, methyl isobutyl, ethyl isobutyl, propyl isobutyl, isopropyl isobutyl, methyl secondary butyl, methyl secondary amyl, methyl secondary isoamyl, ethyl secondary butyl, ethyl secondary amyl, ethyl secondary isoamyl, propyl secondary butyl, propyl secondary amyl, propyl secondary isoamyl, isopropyl secondary butyl, isopropyl secondary amyl, isopropyl secondary isoamyl, methyl tertiary butyl, ethyl tertiary butyl, propyl tertiary butyl, isopropyl tertiary butyl, methyl tertiary amyl, ethyl tertiary amyl, and other mixed ethers are excellently suited for use, singly or combined in the above outlined or other organic acid extraction processes, where chemical stability, a relatively high volatility, good acid dissolving properties, and a low solubility in water, are required from the solvent.

In our co-pending application Serial No. 547,784, filed June 29, 1931, we have described a novel method for preparing mixed tertiary ethers.

While our solvents can be used for concentrating a large number of the organic carboxylic acids, the advantages of using mixed ethers for this purpose are particularly noticeable when lower aliphatic acids of fatty and/or hydroxy series are to be produced from their dilute water solutions. Formic, acetic, propionic, butyric and lactic acids were concentrated from their dilute aqueous solutions either by extraction with one of the mentioned solvents followed by distillation, or by distilling off the diluent water in the presence of a relatively small quantity of one of said solvents, without the extraction step. In practice, it is preferable, although not always necessary, to employ solvents having boiling temperatures below those of the acids being concentrated. We have observed that by using a sufficient quantity of a mixed ether, the aliphatic acid can be readily extracted from its dilute aqueous solutions and concentrated to any desired degree up to 100% acid in a batch or continuous operation.

In order to illustrate the superiority of mixed ethers over normal ethers, comparative data were obtained by extracting a fixed volume of 15% acetic acid with various ethers; quantities of ethers were the same in all cases.

| Ether used | Percent acid removal | Relative efficiency |
|---|---|---|
| Methyl tertiary butyl | 61.5, 60.0 | 100.0 |
| Methyl tertiary amyl | 45.5 | 74.5 |
| Methyl sec. butyl | 44.7 | 73.5 |
| Isopropyl | 26.0 | 42.8 |
| Diethyl | 52.2, 52.5 | 85.5 |

These data demonstrate the superiority of mixed ethers over di-isopropyl ether, but the same is not indicated with regard to the diethyl ether. However, the recovery of concentrated acid requires the step of distilling off the ether, and it is in this stage of the process that the relative deficiency of diethyl ether is to be noted. In the course of distilling the ether-water mixture from the acid extract, mixed ethers were found to be far more effective in separating water from the acid that diethyl ether, so that, while a methyl tertiary butyl ether extract of acetic acid can be readily distilled to produce 90% or better acetic acid, a similar extract of diethyl ether yields only 60% acid.

In carrying out our invention in practice we prefer to employ a continuous process, in which a solvent comprising one or more of the mixed ethers mentioned above is passed through a vertical contact vessel in an upward flow countercurrently to a stream of a dilute organic acid. In order to obtain a larger area of contact between the aqueous and solvent phases we may inject our solvent into the contact vessel under more or less high pressure through a small orifice, or accomplish the dispersion of the solvent by some other physical means. Finely divided globules of the solvent rise then through the descending stream of the progressively deconcentrated acid, extracting more and more acid as they ascend. On the other hand, if desirable, the solution to be extracted may be dispersed throughout the solvent in a similar manner, the solvent now becoming the continuous phase.

As a result of a sufficient contact of the two phases and due to the solubility characteristics of the materials used in the process, the acid distributes itself according to its partition coefficient between the water and the solvent phases. In this manner the acid content of the water phase can be reduced to any desired low value by regulating the operating conditions and the relative quantity of the solvent used in the process.

The liquid continuously flowing from the top of the contact vessel consists essentially of the solvent and the extracted acid, and contains a relatively small quantity of water, which is quite insoluble in our solvents.

This acid extract is subjected to a fractional distillation, the acid being produced as the distillation residue. The vaporized solvent and steam are condensed into an acid-free condensate, and, being substantially immiscible, separate into two phases. At ordinary temperatures the condensed solvent contains only a very small quantity of water and can be immediately recycled through the process.

In certain cases it is possible to accomplish concentration of a relatively dilute aliphatic acid by simply adding to it a quantity of a mixed ether or a solvent containing such an ether, and then distilling off the solvent and water from the mixture, thereby producing the acid of a higher concentration than the original relatively dilute acid. We have found that this method of operation serves particularly well when the acid to be concentrated is not very dilute but its concentration is near the critical point, i. e. the point when the dilute acid becomes miscible with the selected solvent at a given temperature.

From our observations of the processes employing various solvents we have reached a conclusion that mixed ethers are often far superior to the solvents previously used for concentrating organic acids, so that it is possible to produce a quantity of the concentrated acetic acid from a dilute acid by using far less of a mixed ether, than would be required of diethyl or isopropyl ether, for example, for producing the same yield of the concentrated acid. The greater efficiency of the new process appears to result from the higher selectivity of the new solvents with regard to the components of an aliphatic acid-water system.

We have also discovered that mixed ethers, such as mentioned hereinbefore, can be successfully used as components of complex solvents used for concentrating organic acids. For example, these ethers can be used together with other solvents, such as hydrocarbons (pentane, hexane, light naphthas and the like), and/or certain esters, in order to produce solvents affording higher partition coefficients for the acid and having a lower solubility in water, as well as a lower capacity to dissolve the same, thus increasing the efficiency with which a dilute organic acid can be concentrated.

Often, the dilute aliphatic acids which are concentrated by extraction with suitable solvents contain certain quantities of mineral acids. It was found, that it is very desirable that these mineral acids were thoroughly removed by neutralization or precipitation from mixtures either before or after adding to them or extracting them with mixed ethers, because mineral acids promote the decomposition of such ethers particularly at distillation temperatures. However, if a mineral acid is left in a mixture to be distilled, we found, that by adding an excess of a known neutralizing agent or precipitant for such an acid to the distilling mixture, the effect of acid upon mixed ethers is effectively eliminated. For example, effective quantities of $BaCO_3$ or $Ba(OH)_2$ or $Ba(OOCCH_3)_2$ (solid or in solution) may be used to suppress the effect of the sulfuric acid present in a mixture, from which a mixed ether is to be removed by distillation; $AgOOCCH_3$ may be employed in the case of hydrochloric acid.

It is obvious that a large number of the process steps and conditions (temperatures, pressures, and concentrations) and their combinations can be conceived for concentrating the individual or mixed dilute organic acids in practice by using our invention. We do not intend, however, to limit our claims to any specific method for practising the same, but believe any method or process, either batch or continuous, adapted for concentrating dilute organic acids and comprising the step of treating said acids with a mixed ether in any manner whatsoever, to be within the scope of our invention.

We claim as our invention:

1. The process for concentrating an aqueous carboxylic acid which comprises subjecting said acid to selective extraction with an agent essentially comprising at least one mixed aliphatic ether.

2. The process for concentrating an aqueous lower aliphatic carboxylic acid which comprises subjecting said acid to selective extraction with an agent essentially comprising at least one mixed aliphatic ether.

3. The process for concentrating aqueous acetic acid which comprises subjecting the aqueous acetic acid to selective extraction with an agent essentially comprising at least one mixed aliphatic ether.

4. The process for concentrating an aqueous carboxylic acid which comprises subjecting the aqueous acid to selective extraction with an agent essentially comprising at least one mixed aliphatic tertiary ether.

5. The process for concentrating an aqueous carboxylic acid which comprises subjecting the aqueous acid to selective extraction with an agent essentially comprising at least one mixed aliphatic ether possessing a butyl radical linked to the ethereal oxygen atom.

6. The process for concentrating an aqueous carboxylic acid which comprises subjecting the aqueous acid to selective extraction with an agent essentially comprising at least one mixed aliphatic ether possessing a tertiary amyl radical linked to the ethereal oxygen atom.

7. In a process for concentrating an organic carboxylic acid from its aqueous solution, the steps of treating said acid solution with a solvent essentially comprising a mixed aliphatic ether and separating by physical means the excess water and the solvent from the acid.

8. The process of claim 7 wherein an aqueous aliphatic acid is treated.

9. The process of claim 7 wherein the solvent employed essentially comprises a substantial quantity of a mixed aliphatic ether and a normally fluid hydrocarbon.

10. In a process for concentrating an organic carboxylic acid from its aqueous solution, the steps of extracting the acid from the solution with a solvent essentially comprising a mixed aliphatic ether and removing the concentrated acid from the extract by distillation.

11. The process of claim 10 wherein an aqueous aliphatic acid is treated.

12. In a continuous process for concentrating an organic carboxylic acid from its aqueous solution, the steps of contacting counter-current streams of the solution and a solvent essentially comprising a mixed aliphatic ether, thereby extracting the acid from its aqueous solution, continuously withdrawing the resultant acid extract, and subjecting the same to a distillation to separate the concentrated acid from the solvent and water.

13. In a cyclic process for concentrating an organic carboxylic acid from its aqueous solution, the steps of contacting countercurrent streams of the solution and a solvent essentially comprising a mixed aliphatic ether in a contact zone thereby extracting the said acid from its aqueous solution, continuously withdrawing the resultant acid extract from the contact zone, evaporating the solvent and water from the extract and removing the concentrated acid, condensing the vaporized solvent and water, thereby producing a non-miscible solvent-water system, and continuously returning the condensed solvent to the process.

14. In a process for concentrating an organic carboxylic acid from its aqueous solution, a step of subjecting said acid solution to a fractional distillation in the presence of a solvent essentially comprising a mixed aliphatic ether, thereby evaporating the solvent and water and concentrating the acid.

15. In a process for the recovery of an organic carboxylic acid from its aqueous solution, the steps of mixing said solution with a solvent essentially comprising a mixed aliphatic ether and concentrating the acid by evaporating from the resultant solution the solvent and water.

16. In a process for concentrating acetic acid from its aqueous solution, the steps of extracting the acid from its aqueous solution with a solvent essentially comprising a mixed aliphatic ether and removing the concentrated acid from the extract by fractional distillation.

17. In a process for concentrating a relatively dilute acetic acid, a step comprising subjecting said acid to a fractional distillation in the presence of a solvent essentially comprising a mixed aliphatic ether, thereby evaporating the solvent and the water and concentrating the acid.

18. In a process for concentrating an organic carboxylic acid from its aqueous solution containing a mineral acid, the step of subjecting said acid solution to a fractional distillation in the presence of a mixed aliphatic ether and a neutralizing agent insufficient in amount to substantially neutralize the organic carboxylic acid.

19. The process of claim 18 wherein the mineral acid is sulphuric acid and the neutralizing agent is a barium compound.

20. In a process for concentrating an organic carboxylic acid from its aqueous solution containing a mineral acid, the steps of neutralizing said mineral acid without substantial neutralization of the organic acid and then subjecting the latter to distillation in the presence of a mixed aliphatic ether.

21. The process for continuously separating water from its solution with acetic acid, in which the dilute acid is extracted with ethyl tertiary amyl ether, the aqueous layer discharged after substantially complete exhaustion, the ether layer, containing substantially all of the acid originally present and part of the water, passed to a column still in which the ether removes the water in an azeotropic distillation and the acetic acid discharged in a concentrated condition from the column base.

22. The process for continuously separating water from its solution with formic acid in which the dilute acid is extracted with methyl tertiary amyl ether, the aqueous layer discharged after substantially complete exhaustion, the ether layer containing substantially all of the acid originally present and part of the water, passed to a column still in which the ether removes the water in an azeotropic distillation and the formic acid discharged in a concentrated condition from the column base.

23. In the process of dehydrating aqueous solutions of one or more of the lower fatty acids, the use of mixed ethers having normal boiling points between 80° C. and 105° C. for extracting the acid or acids from the water.

24. The process of dehydrating aqueous solutions of one or more of the lower fatty acids by distillation in the presence of a mixed ether having a normal boiling point between 80° C. and 105° C., said ether acting as a withdrawing agent for the water.

25. The process for continuously separating water from its solution with one or more of the lower fatty acids, in which the dilute acid or acids is extracted with a mixed ether having a normal boiling point between 80 and 105° C., the aqueous layer discharged after substantially complete exhaustion, the ether layer, containing substantially all of the acid or acids originally present and part of the water, passed to a column still in which the ether removes the water in an azeotropic distillation and the lower fatty acid or acids are discharged in a concentrated condition.

26. The process for separating water from a mixture with one or more of the lower fatty acids by distillation with a mixed ether having a normal boiling point between 80 and 105° C., in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated fatty acid or acids.

27. In the process of dehydrating aqueous acetic acid, the use of mixed ethers having normal boiling points between 80 and 105° C. for extracting the acetic acid from the water.

28. The process of dehydrating aqueous acetic acid by distillation in the presence of a mixed ether having a normal boiling point between 80 and 105° C., said ether acting as a withdrawing agent for the water.

29. The process for continuously separating water from its solution with acetic acid, in which the dilute acid is extracted with a mixed ether having a normal boiling point between 80 and 105° C., the aqueous layer discharged after substantially complete exhaustion, the ether layer, containing substantially all of the acid originally present and part of the water, passed to a column still in which the ether removes the water in an azeotropic distillation and the acetic acid discharged in a concentrated condition from the column base.

30. The process for separating water from acetic acid by distillation with a mixed ether having a boiling point between 80 and 105° C., in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated acetic acid in the still pot.

31. The process for separating water from actic acid by distillation with ethyl tertiary amyl ether, in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated acetic acid in the still pot.

32. The process for continuously separating water from its solution with formic acid, in which the dilute acid is extracted with a mixed ether having a normal boiling point between 80 and 105° C., the aqueous layer discharged after substantially complete exhaustion, the ether layer, containing substantially all of the acid originally present and part of the water, passed to a column still in which the ether removes the water in an azeotropic distillation and the formic acid discharged in a concentrated condition from the column base.

33. The process for separating water from formic acid by distillation with a mixed ether having a boiling point between 80 and 105° C., in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated formic acid in the still pot.

34. The process for separating water from formic acid by distillation with methyl tertiary amyl ether in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated formic acid in the still pot.

35. The process for continuously separating water from its solution with butyric acid, in which the dilute acid is extracted with a mixed ether having a normal boiling point between 80 and 105° C., the aqueous layer discharged after substantially complete exhaustion, the ether layer, containing substantially all of the acid originally present and part of the water, passed to a column still in which the ether removes the water in an azeotropic distillation and the butyric acid discharged in a concentrated condition from the column base.

36. The process for separating water from butyric acid by distillation with a mixed ether having a boiling point between 80 and 105° C., in which the water and ether forms an azeotropic mixture in the still head, the vaporous azeotropic mixture condensed, the condensate separated into a water and an ether layer, the water layer discharged, the ether layer returned to the still head to remove more water, and the process conducted so as to give concentrated butyric acid in the still pot.

37. The process for continuously separating a substantial amount of the water present in its solution with one or more of the lower fatty acids in which the dilute acid from said acid or acids, is extracted with a mixed ether having a normal boiling point between 80° and 105° C., the aqueous layer discharged after substantially complete exhaustion, the ether layer, containing substantially all of the acid or acids originally present and part of the water passed to a column still in which the ether removes part but not all of the water in an azeotropic distillation, and the lower fatty acid or acids are discharged containing some of the water originally present.

38. The process for separating a substantial amount of the water in a mixture with one or more of the lower fatty acids by distillation with a mixed ether having a normal boiling point between 80° and 105° C., in which the water and ether forms an azeotropic mixture in the still head, the vaporous azeotropic mixture is condensed, the condensate separated into a water and an ether layer, the water layer discharged, the ether layer returned to the still head to remove more water, and the process conducted so as to give fatty acid or acids still containing some water.

THEODORE EVANS.
KARL R. EDLUND.